United States Patent Office 3,767,751
Patented Oct. 23, 1973

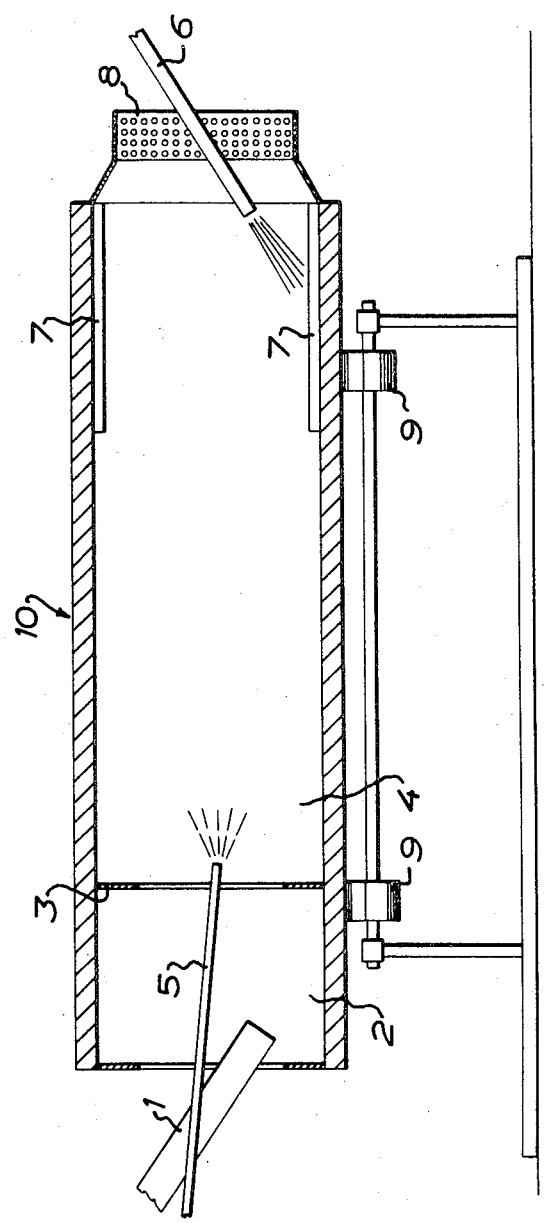

3,767,751
PROCESS FOR MAKING PELLETIZED GLASS BATCHES
Bo Kurt Wilhelm Simmingsköld and Vlastimil Carbol, Vaxjo, Sweden, assignors to Glasforskningsinstitutet, Vaxjo, Sweden
Filed July 8, 1971, Ser. No. 160,657
Int. Cl. B01j 2/12
U.S. Cl. 264—117                5 Claims

ABSTRACT OF THE DISCLOSURE

A process for making pelletized glass batches by mixing pulverulent batch constituents and adding water during rotation and mixing, wherein the pelletization is carried out at a temperature of 100–600° C. and the water is supplied during the pelletizing operation proper is converted into steam.

---

The present invention relates to a process for making glass batches in pelletized form.

The use of loose glass batches involves several disadvantages. Thus, glass batches containing large or small amounts of lead oxide, mostly added in the form of red lead, $Pb_3O_4$, are used to a large extent in making art and household glassware. This red lead is very finely divided, which gives it a strong tendency to dust during weighing, mixing and charging. This endangers the health of those who are busy with batch preparation and glass melting and, also, the dusting of batch material and the evaporation of batch components increase the attack on the refractory parts of the furnace construction.

These disadvantages are eliminated if the glass batch is converted into a more compact form, as is the case with the present invention. When converting the batch into a more compact form, two different methods can be used, viz. (a) pressing or briquetting and (b) pelletizing. In this connection, however, pressing is less advantageous from an economical point of view, since it requires an expensive machine equipment and a high power consumption, and it involves high wear costs. In the present invention it has therefore been found preferable to pelletize the batch. The formation of granular aggregations or pellets during the pelletization takes place by imparting a rotary movement to the batch during simultaneous injection of finely divided liquid, e.g. water or a solution of binder and water.

The size of the pellets may vary from 1–2 mm. diameter to 20–30 mm. diameter but practical melting experiments have shown that pellets having a diameter of about 0.5–2 mm. are preferable from the point of view of handling and melting.

The use of a pelletized glass batch gives the following advantages:

(1) The injection of finely divided water prevents any formation of dust during the batch mixing operation.

(2) The pelletized glass batch has very good floating properties, which facilitates manual charging and also permits charging by machine without any risk of dusting or segregation during transportation and charging.

(3) Dusting is eliminated during charging.

(4) The pelletized batch is very compact. There is almost no air included in the pellets and the air between the pellets forms large bubbles which easily rise. As a consequence of the increased compactness the weight by volume of pelletized batch is 15–30% higher than in the case of loose batch. This means that the heat transition is improved and the melting rate increases. Moreover, a larger amount can be charged in the crucible at one time, and therefore 2 charges instead of normally 3 are sufficient in practice.

(5) Practical melting experiments have shown that by using pellets formed by pelletization the melting time is reduced by about 25%. The melting temperature can be considerably reduced. The composition of the finished glass corresponds exactly to the calculated composition, which shows that there are practically no losses of lead. Owing to the increased lead oxide content, the longer effective melting time and better homogeneity, the refractive index is always higher when using pelletized batch than when using loose batch.

The pelletization of the batch, however, is not quite unexceptionable. The added amount of water may vary between 6 and 25% in dependence on the composition of the batch. The water delays the melting of the batch due to its strong cooling effect, and therefore it is necessary from a practical point of view to dry the pelletized batch before passing to melting.

The drying operation requires a special equipment and when using higher water percentages it also requires considerable heating, which makes the process more expensive. In certain cases drying may be particularly difficult to carry out because the pellets undergo a phase when the water-soluble components of the batch (e.g. soda, potash, borax) "wet" the pellets under the influence of increased temperature and increased solubility. This reduces the strength of the pellets to such a degree that they are destroyed when exposed to a minimum of mechanical action.

These problems are eliminated through the present invention which relates to a process for making pelletized glass batches by mixing pulverulent constituents and adding liquid, preferably water, and forming said constituents into granular aggregations or pellets during simultaneous rotation and mixing, wherein the pelletization is carried out at a temperature of 100–600° C. and the liquid supply takes place in form of steam simultaneously with the pelletization. This is achieved by carrying out the pelletization at increased temperature. This makes it possible to make pellets with a much smaller addition of water than heretofore, and the added amount of water may be removed during the same process without said pellets undergoing any "soft" phase. This is due to the following facts. Soda, potash and borax, which are the most common alkaline components in a glass batch, crystallize at room temperature with crystal water. If the temperature is increased, the crystal water is released and through a highly increased solubility a part of the soda or potash is dissolved in its own crystal water and in excess water which has been added during the pelletizing process. On account of this, the initially hard pellets become soft and apt to disintegrate. If the pelletization, however, takes place at a temperature of 100–600° C., as in the present invention, soda and potash cannot take up crystal water, whereby the water required is reduced and no reduction of strength occurs.

According to a preferred embodiment of the invention the temperature at the beginning of the pelletization zone is 100–300° C. and progressively moving therethrough increases.

The process according to this invention may suitably be carried out by means of the device shown in the accompanying drawing.

In the drawing, reference numeral 10 designates generally the entire pelletizing device which is in the form of a rotary barrel. This barrel, which is about 3 m. long, is inclined at an angle of about 1–10°, peferably 1–4°, to the horizontal plane and it rotates at a rate of about 2–30 r.p.m., preferably 4–14 r.p.m. The glass batch intended for pelletization, which has an approximate moisture content of 5%, enters the device at 1 in a mixing zone 2. This mixing zone is defined in the feed direction by means of an annular disc 3. After passing the mixing zone 2 the batch enters into the pelletizing zone proper 4, where water is supplied through a nozzle 5. This water, which is transformed into steam because of the ambient high temperature, assures a satisfactory formation of pellets and counteracts efficiently dusting of the batch. The nozzle 5 is preferably arranged at an angle of 80° to the batch mixture. Owing to the inclination and rotation of the barrel the batch is fed forwardly all the time, i.e. to the right of the drawing figure. At the same time as the pelletized batch is fed forwardly it is heated by means of hot gases passing countercurrently to the batch through the barrel from a burner 6 placed at the discharge end of the barrel. Longitudinal ribs 7 are attached to the inside of the barrel near its discharge end. Finally, the ready pelletized batch is discharged through a screen 8. The barrel can be rotated in any convenient manner, for instance by means of supporting and driving wheels 9, as shown in the drawing.

The temperatures occurring in the barrel vary with the composition of the glass batch used and with the distance from the burner so that the temperature increases in a direction from the feed end towards the discharge end. Generally the temperature in the barrel may be said to vary between 100 and 600° C. As examples of the temperature distribution in the barrel the following temperatures may be mentioned: at the opening at the input side 275° C., at the water injection about 300° C., in the middle of the barrel about 375° C., and about 400° C. at approximately 0.5 m. from the discharge opening of the barrel.

By controlling the addition of water the final water content can be varied for instance between 1.5 and 4.0%, which is an optimum value from the point of view of melting.

What we claim and desire to secure by Letters Patent is:

1. A process for forming, from a pulverulent glass forming composition containing soda and potash, pellets having a water content low enough to eliminate drying prior to melting, said process also providing conditions for preventing said pellets undergoing any soft phase during said forming, comprising:
   (a) introducing said composition into the mixing zone of a rotating pelletizing barrel having a feed end and a discharge end,
   (b) conveying said composition within said barrel from said mixing zone to a pelletizing zone wherein the temperature is maintained between 100° and 600° C., and progressively increases toward said discharge end,
   (c) injecting into said pelletizing zone a controlled amount of water which is transformed into steam, whereby said soda and potash cannot take up crystal water while said composition is rotated in said barrel to form pellets thereof, and
   (d) discharging said formed pellets from said discharge end of said barrel.

2. The process of claim 1 wherein the temperature at the beginning of said pelletization zone is 100°–300° C.

3. The process of claim 1 wherein the temperature in said pelletizing zone is about 300° C. at the water injection, is about 375° C. in the middle of a said barrel and is about 400° C. in the proximity of said barrel discharge end.

4. The process of claim 1 wherein said injected water contains a binder in solution therewith.

5. The process of claim 1 wherein the final water content of said formed pellets is between 1.5 and 4.0%.

References Cited
UNITED STATES PATENTS

| | | | |
|---|---|---|---|
| 3,206,528 | 9/1965 | Coombs et al. | 264—117 |
| 3,555,133 | 1/1971 | Gentaz | 264—117 |
| 3,402,229 | 9/1968 | Felder | 264—117 |

ROBERT F. WHITE, Primary Examiner

J. R. HALL, Assistant Examiner

U.S. Cl. X.R.

23—313